(12) United States Patent
Lan et al.

(10) Patent No.: US 7,452,101 B2
(45) Date of Patent: Nov. 18, 2008

(54) PLANAR LIGHT SOURCE

(75) Inventors: Yuan-Ker Lan, Hsinchu (TW); Horng-Bin Hsu, Taipei (TW); Hung-Ru Hsu, Changhua (TW)

(73) Assignee: AU Optronics Corporation, Hsinchu (TW)

( * ) Notice: Subject to any disclaimer, the term of this patent is extended or adjusted under 35 U.S.C. 154(b) by 177 days.

(21) Appl. No.: 11/405,220

(22) Filed: Apr. 17, 2006

(65) Prior Publication Data

US 2007/0127236 A1 Jun. 7, 2007

(30) Foreign Application Priority Data

Dec. 5, 2005 (TW) .............................. 94142822 A (51) Int. Cl.
*F21S 4/00* (2006.01)
(52) U.S. Cl. ....................................... 362/225; 362/614
(58) Field of Classification Search ................. 362/613, 362/97, 219, 225, 634; 313/634–635, 422
See application file for complete search history.

(56) References Cited

U.S. PATENT DOCUMENTS 7,159,999 B2 * 1/2007 Yoo et al. ................... 362/249

FOREIGN PATENT DOCUMENTS

| CN | 1609923 | 4/2005 |
|---|---|---|
| CN | 1621920 | 6/2005 |
| JP | 6075216 | 3/1994 |
| JP | 2005347062 | 12/2005 |
| KR | 1020040013020 | 2/2004 |
| WO | WO 2005/064393 | 7/2005 |

OTHER PUBLICATIONS

English language translation of abstract and relevant parts of JP6075216, Mar. 18, 1994.
English language translation of abstract and pertinent parts of CN 1609923, Apr. 27, 2005.
English language translation of abstract and pertinent parts of CN 1621920, Jun. 1, 2005.
English language translation of abstract of JP 2005347062, Dec. 15, 2005.

* cited by examiner

*Primary Examiner*—Ali Alavi
(74) *Attorney, Agent, or Firm*—Thomas, Kayden, Horstemeyer & Risley (57) ABSTRACT

A planar light source is disclosed. The planar light source includes an upper substrate having a central portion and two edge portions and a lower substrate opposite to the upper substrate, wherein a plurality of luminous cavities are formed by and between the upper substrate and the lower substrate. With respect to cross sectional areas, one portion of the luminous cavities corresponding to the central portion of the upper substrate is smaller than the other portion of the luminous cavities corresponding to one of the edge portions of the upper substrate, and thus the lightness produced in the central portion is higher than that in the edge portion.

20 Claims, 7 Drawing Sheets

PLANAR LIGHT SOURCE

RELATED APPLICATIONS

The present application is based on, and claims priority from, Taiwan Application Serial Number 94142822, filed Dec. 5, 2005, the disclosure of which is hereby incorporated by reference herein in its entirety.

BACKGROUND

1. Field of Invention

The present invention relates to a planar light source. More particularly, the present invention relates to a planar light source which can increase the lightness in the central portion of the display.

2. Description of Related Art

Because liquid crystal applied in a liquid crystal panel cannot emit light itself, a backlight module has to be added below the liquid crystal panel. The main function of the backlight module is to provide a light source with sufficient lightness and uniform light distribution, so that a liquid crystal display (LCD) can show an image. In general, the backlight module may be divided into two types of design, which are a direct-type backlight module and an edge-type backlight module. The design of the direct-type backlight module is to install a light source (e.g. a fluorescent lamp) right below the backlight module and to use more than two lamps to increase the light intensity, and thus is suitable for use in a display panel requiring higher lightness and larger size, such as a liquid crystal monitor or liquid crystal television.

Figure 1:
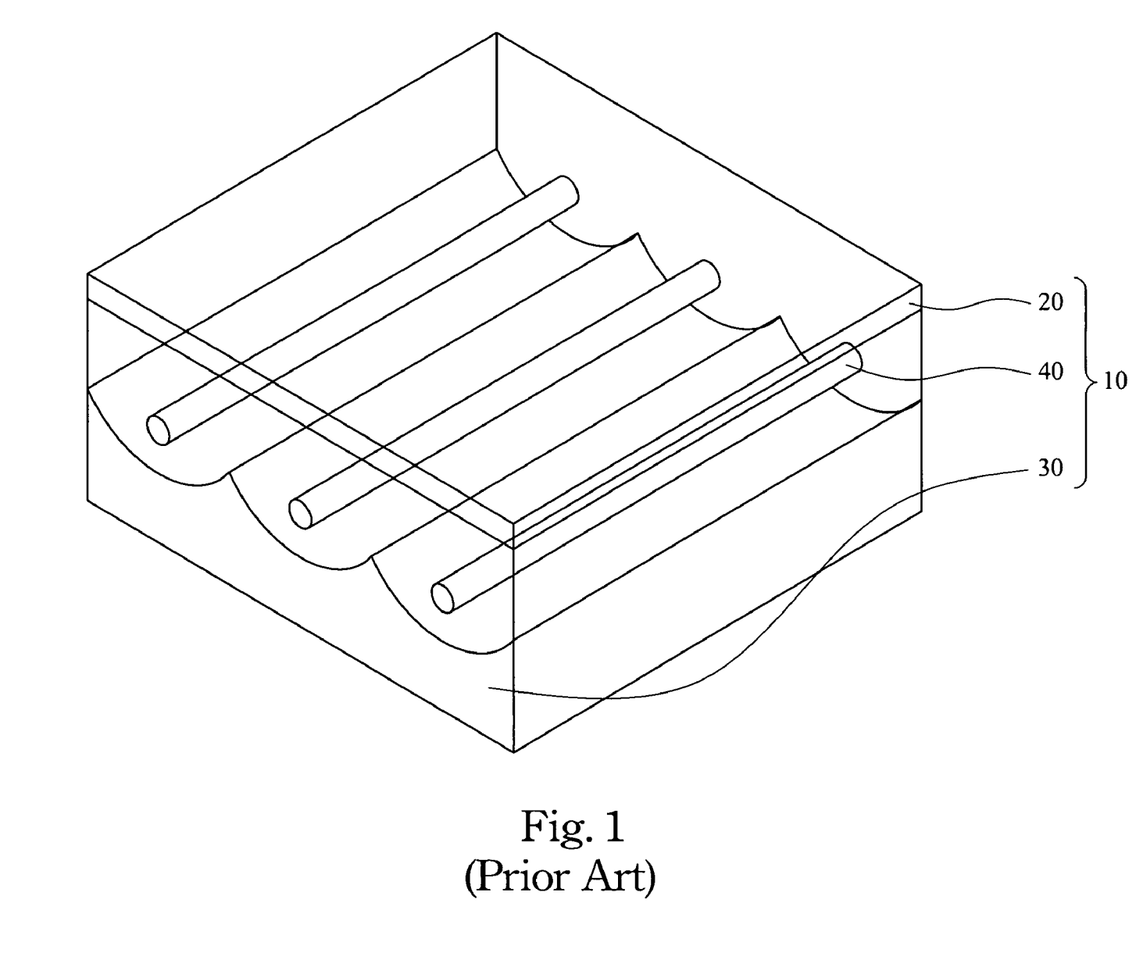
FIG. 1 is a schematic perspective view showing a planar light source of a conventional direct-type backlight module.

Referring to FIG. 1, FIG. 1 is a schematic perspective view showing a planar light source 10 of a conventional direct-type backlight module. The planar light source 10 includes an upper substrate 20, a lower substrate 30 with a plurality of grooves (not labeled) and a plurality of cold cathode fluorescent lamps 40 arranged in parallel between the upper substrate 20 and the lower substrate 30, wherein the cold cathode fluorescent lamps 40 are installed below a display panel (not shown) for providing sufficient lightness for the display panel. Because the cold cathode fluorescent lamps 40 all are of substantially the same tube diameters, they basically have the same lightness, and additionally, the cold cathode fluorescent lamps 40 are arranged in parallel and evenly spaced to each other for luminous uniformity. In practice, due to the limitation of human vision, the planar light source is merely required to have the luminous uniformity of about 75-80%, wherein too high uniformity actually does not add any extra value to the display quality. Moreover, the human vision generally demands higher lightness in the central portion of the panel. However, the conventional planar light source has quite uniform distribution of lightness, and it has to use a larger power light source installed in the central portion of the display panel for meeting the requirement of higher lightness in the central portion, thus resulting in the problem of the display panel having too much power consumption.

SUMMARY

It is therefore an aspect of the present invention to provide a planar light source, wherein the cross-sectional areas of the luminous cavities corresponding to a central portion of the planar light source are smaller than those corresponding to two edge portions thereof, so that the thinner luminous cavities corresponding to the central portion of the planar light source have higher lightness than the thicker luminous cavities corresponding to the edge portions thereof, thereby avoiding installing the light source of bigger power for making the central portion of the display panel meet the requirement of higher lightness.

It is another aspect of the present invention to provide a planar light source, wherein the distances between every two adjacent luminous cavities corresponding to a central portion of the planar light source are smaller than that corresponding to two edge portions thereof, so that the light density of the luminous cavities corresponding to the central portion thereof is higher than that corresponding to the edge portions thereof, and thus the lightness produced corresponding to the central portion is higher than that corresponding to the edge portions, thereby avoiding installing the light source of bigger power for is making the central portion of the display panel meet the requirement of higher lightness.

It is still another aspect of the present invention to provide a planar light source, wherein the distances between every two adjacent luminous cavities corresponding to the central portion of the planar light source and the cross-sectional areas of the luminous cavities corresponding to the central portion thereof are smaller than those corresponding to the edge portions thereof, thereby avoiding installing the light source of bigger power for making the central portion of the display panel meet the requirement of higher lightness.

In accordance with a preferred embodiment of the present invention, the present invention provides a planar light source. The planar light source includes an upper substrate having a central portion and two edge portions, and a lower substrate opposite to the upper substrate. A plurality of luminous cavities is formed by and between the upper substrate and the lower substrate, wherein a cross-sectional area of one of the luminous cavities corresponding to the central portion of the upper substrate is smaller than that of the luminous cavities corresponding to one of the two edge portions of the upper substrate.

In accordance with another preferred embodiment of the present invention, the present invention provides a planar light source. The planar light source includes an upper substrate having a central portion and two edge portions, and a lower substrate opposite to the upper substrate. A plurality of luminous cavities is formed by and between the upper substrate and the lower substrate, wherein a distance between every two adjacent luminous cavities corresponding to the central portion of the upper substrate is smaller than that between every two adjacent luminous cavities corresponding to the at least one of the two edge portions of the upper substrate.

In accordance with the still another preferred embodiment of the present invention, the present invention provides a planar light source. The planar light source includes an upper substrate having a central portion and two edge portions, and a lower substrate opposite to the upper substrate. A plurality of luminous cavities is formed by and between the upper substrate and the lower substrate, wherein a distance between every two adjacent luminous cavities and a cross-sectional area of one of the luminous cavities corresponding to the central portion of the upper substrate are smaller than that between every two adjacent luminous cavities and the cross-sectional area thereof corresponding to the two edge portions of the upper substrate.

With the application of the present invention, by adjusting the cross-sectional areas of the luminous cavities and the distance between every adjacent two luminous cavities, the lightness of the central portion of the display panel can be increased with proper luminous uniformity. Therefore, in comparison with the conventional planar light source, the present invention can effectively resolve the power consumption problem of the conventional display panel.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2A:
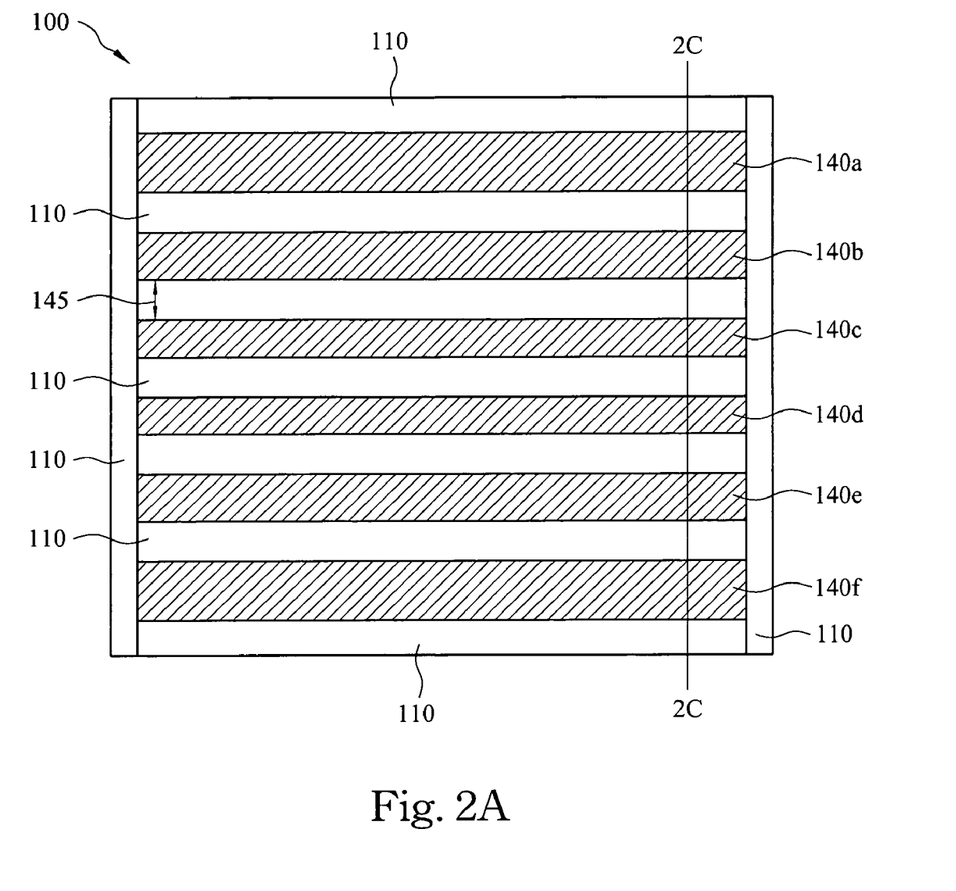
FIG. 2A is a schematic top view showing a planar light source according to a first preferred embodiment of the present invention.
Figure 2B:
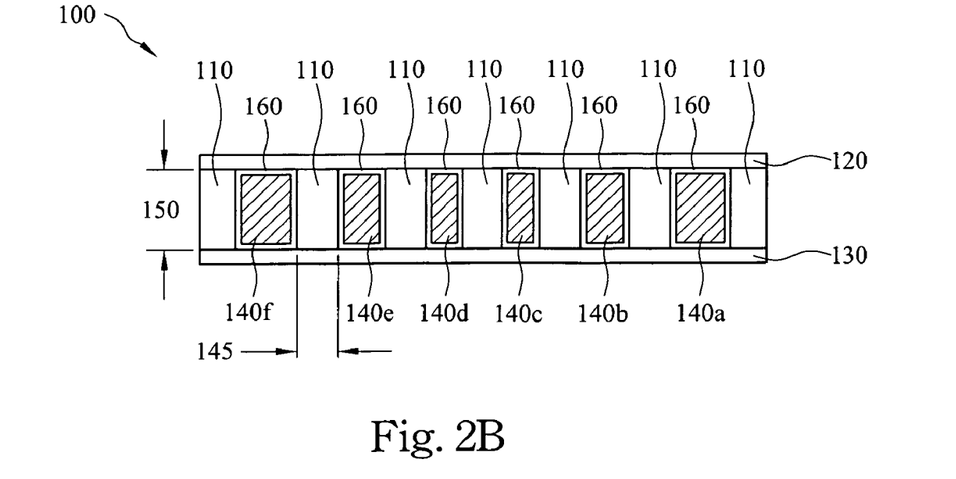
FIG. 2B is a schematic cross-sectional diagram viewed along line 2C-2C shown in FIG. 2A.

Referring to FIG. 2A and FIG. 2B, FIG. 2A is a schematic top view showing a planar light source 100 according to a first preferred embodiment of the present invention, and FIG. 2B is a schematic cross-sectional diagram viewed along line 2C-2C shown in FIG. 2A. The planar light source 100 includes an upper substrate 120, a lower substrate 130, a plurality of spacers 110 and a plurality of luminous cavities, such as the luminous cavities 140a, 140b, 140c, 140d, 140e and 140f. The cross-sectional area of the luminous cavity 140a is substantially the same as that of the luminous cavity 140f; the cross-sectional area of the luminous cavity 140b is substantially the same as that of the luminous cavity 140e; and the cross-sectional area of the luminous cavity 140c is substantially the same as that of the luminous cavity 140d. The cross-sectional areas of the luminous cavities 140a, 140b and 140c are different, and the relationships thereof are that: the cross-sectional area of the luminous cavity 140a is larger than that of the luminous cavity 140b; and the cross-sectional area of the luminous cavity 140b is larger than that of the luminous cavity 140c. Similarly, the relationships of the cross-sectional areas among the luminous cavities 140d, 140e and 140f are that: the cross-sectional area of the luminous cavity 140f is larger than that of the luminous cavity 140e; and the cross-sectional area of the luminous cavity 140e is larger than that of the luminous cavity 140d.

The spacers 110 are disposed in a space 150 formed between the upper substrate 120 and the lower substrate 130, thereby forming the aforementioned luminous cavities. Further, the planar light source 100 includes a fluorescent layer 160 disposed in each of the luminous cavities 104a, 104b, 104c, 104d, 104e and 104f. The upper substrate 120 and the lower substrate 130 are transparent substrates made of the material selected from glass or polymer material, and the spacers 110 may be optionally made of glass or ceramic material, wherein the spacers 110 may be formed by, for example, directly forming the spacers 110 on the upper substrate 120, i.e. the spacers 110 and the upper substrate 120 are formed as one piece; or, for example, the spacers 110, the upper substrate 120 and the lower substrate 130 are formed as one piece; or, for example, the spacers 110, the upper substrate 120 and the lower substrate 130 are formed separately, i.e. the spacers 110 and the upper substrate 120 or the lower substrate 130 are not formed as one piece.

The aforementioned luminous cavities are arranged in parallel in the space 150 formed between the upper substrate 120 and the lower substrate 130 according to the cross-sectional areas thereof, wherein the cross-sectional. areas of the luminous cavities are increasing from a central portion of the upper substrate 120 to one of two edge portions of the upper substrate 120, and the distances 145 between every two adjacent luminous cavities are substantially the same. It is worthy to be noted that the cross-sectional areas of the luminous cavities may be gradually increasing from the central portion of the upper substrate 120 to the edge portion of the upper substrate 120; or may be not changed gradually. In other words, it is within the scope of the present invention, as long as the cross-sectional areas of one portion of the luminous cavities corresponding to the central portion of the upper substrate 120 are smaller than those of the other portion of the luminous cavities corresponding to the edge portion of the upper substrate 120, for making the lightness produced corresponding to the central portion higher than the edge portion. Because the luminous cavities are disposed under the display panel (not shown), the lightness produced in the central portion of the display panel is higher than the edge portion thereof, when the luminous cavities are arranged in accordance with the aforementioned method. In the present embodiment, the luminous cavities can be external electrode fluorescent lamps (EEFL), and yet any suitable lamps suitable for use in the planar light source are also applicable to the present invention, so that the present invention is not limited thereto. Besides, the area ratio of the central portion to the upper substrate 120 ranges from about ⅛ to about ½, and preferably, from about ¼ to about ¾.

Figure 3A:
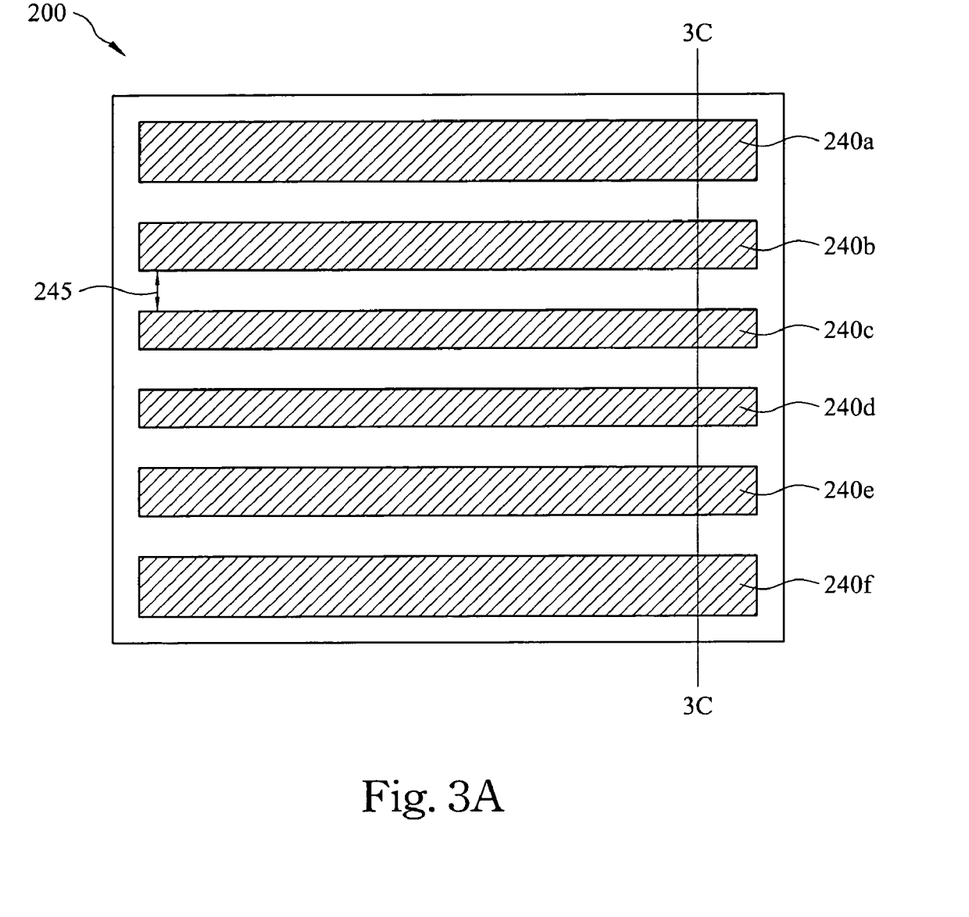
FIG. 3A is a schematic top view showing a planar light source according to a second preferred embodiment of the present invention.
Figure 3B:
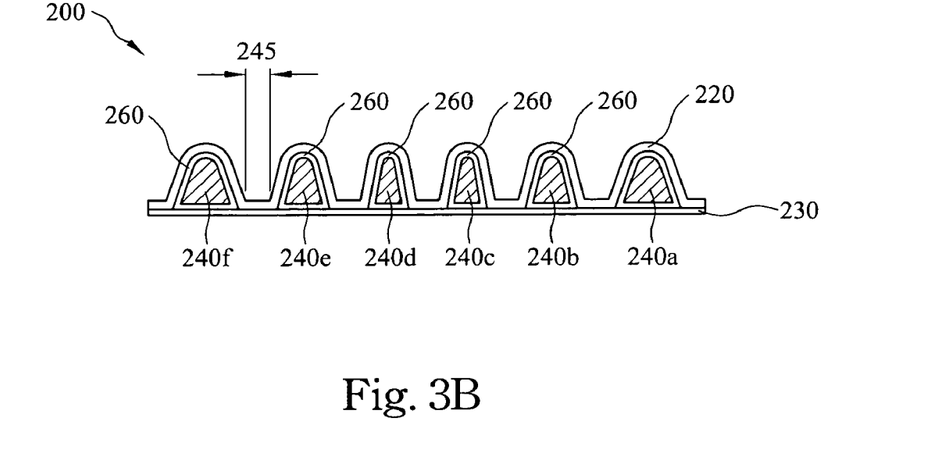
FIG. 3B is a schematic cross-sectional diagram viewed along line 3C-3C shown in FIG. 3A.

Referring to FIG. 3A and FIG. 3B, FIG. 3A is a schematic top view showing a planar light source 200 according to a second preferred embodiment of the present invention; and FIG. 3B is a schematic cross-sectional diagram viewed along line 3C-3C shown in FIG. 3A. The planar light source 200 includes an upper substrate 220, a lower substrate 230, a fluorescent layer 260 and a plurality of luminous cavities, such as the luminous cavities 240a, 240b, 240c, 240d, 240e and 240f. The cross-sectional areas of the luminous cavities are substantially the same as those of the luminous cavities shown in FIG. 2A and FIG. 2B, and the distances 245 between every two adjacent the luminous cavities are substantially the same as the distances 145 shown in FIG. 2A and FIG. 2B. The difference between the planar light source 200 and the planar light source 100 shown in FIG. 2B is that: the planar light source 200 omits the spacers 110 shown in FIG. 2B by modifying the shape of the upper substrate 220 for accommodating the luminous cavities, but the function and result of the planar light source 200 is substantially the same as the planar light source 100, and thus the details thereof are not reiterated herein.

Figure 4:
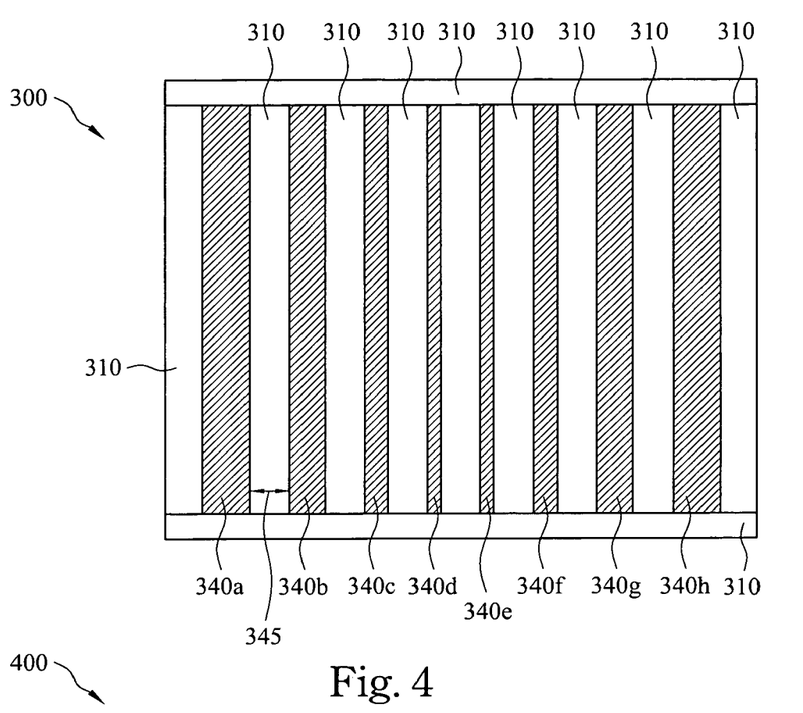
FIG. 4 is a schematic top view showing a planar light source according to a third preferred embodiment of the present invention.

Referring to FIG. 4, FIG. 4 is a schematic top view showing a planar light source 300 according to a third preferred embodiment of the present invention. The planar light source 300 includes an upper substrate (not shown), a lower substrate (not shown), a plurality of spacers 310 and luminous cavities, such as the luminous cavities 340a, 340b, 340c, 340d, 340e, 340f, 340g and 340h. The relationships among the cross-sectional areas of the luminous cavities are similar to those among the luminous cavities shown in FIG. 2A, and the distance 345 between every two luminous cavities are substantially the same. The difference between the planar light source 300 and the planar light source 100 shown in FIG. 2A is that: the arrangement of the luminous cavities is changed from a horizontal arrangement to a vertical arrangement, thereby preventing the phenomenon of too high operating voltage caused by an increased discharge length of the luminous cavities when the planar light source becomes larger in size. Because the function and result of the planar light source 300 is substantially the same as those of the planar light source 100 shown in FIG. 2A, the details thereof are not reiterated herein.

Figure 5:
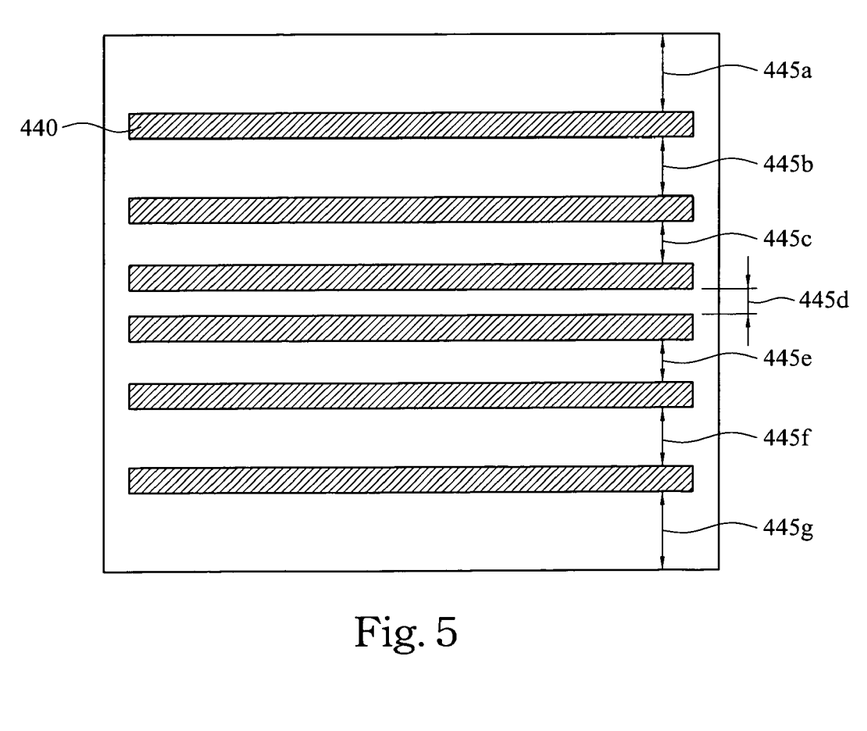
FIG. 5 is a schematic top view showing a planar light source according to a fourth preferred embodiment of the present invention.

Referring to FIG. 5, FIG. 5 is a schematic top view showing a planar light source 400 according to a fourth preferred embodiment of the present invention. The planar light source 400 includes an upper substrate (not shown), a lower substrate (not shown) and a plurality of luminous cavities, such as six luminous cavities 440 of which the cross-sectional areas are substantially the same, wherein the distances between every two adjacent luminous cavities are different, and the relationships of the sizes of the distances are that: the distance 445a is equal to 445g; the distance 445g is wider than 445b; the distance 445b is equal to 445f; the distance 445f is wider than 445c; the distance 445c is equal to 445e; and the distance 445e is wider than 445d. The luminous cavities are sequentially arranged in parallel according to the sizes of the distances between every two adjacent luminous cavities, wherein the distances are increasing from the central portion of the planar light source 400 to the edge portion thereof. The luminous cavities are disposed under the display panel (not shown), and since the distances between every two adjacent luminous cavities are gradually increasing from the central portion of the display panel to the edge portion thereof, the arrangement density of the luminous cavities corresponding to the central portion is greater than that corresponding to the edge portion, so that the lightness at the central portion of the display panel is higher than that at the edge portion thereof. It is noted that the distances between every two adjacent luminous cavities may be gradually increasing in size from the central portion of the display panel to the edge portion thereof; or may be not changed gradually. In other words, it is within the scope of the present invention, as long as the distances between every two adjacent luminous cavities corresponding to the central portion of the display panel are smaller than those corresponding to the edge portion thereof for making the central portion of the display panel have a higher lightness than the edge portion thereof. In the present embodiment, the luminous cavities may be external electrode fluorescent lamps (EEFL), and yet any suitable lamps suitable for use in the planar light source are also applicable to the present invention, so that the present invention is not limited thereto. Besides, the area ratio of the central portion to the upper substrate ranges from about ⅛ to about ½, and preferably, from about ¼ to about ¾.

Figure 6:
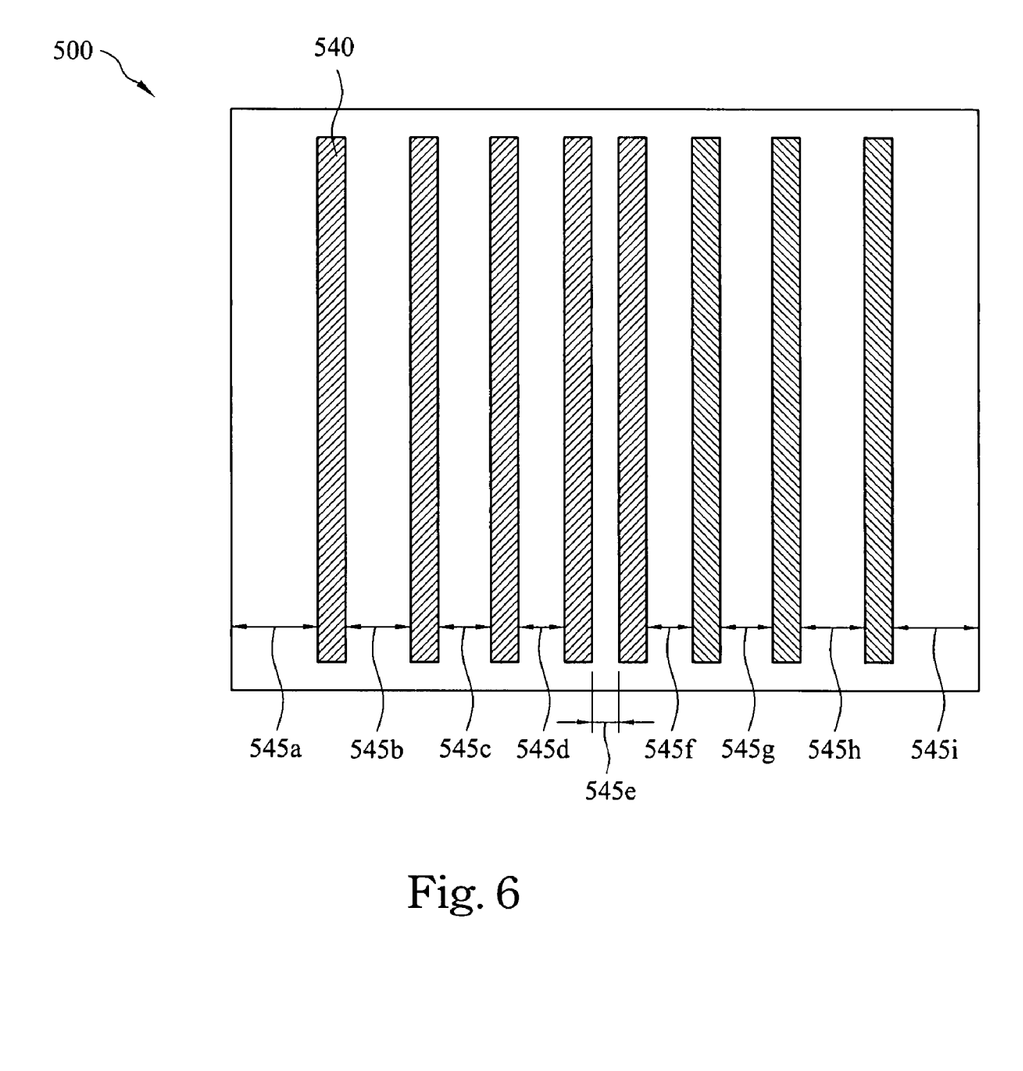
FIG. 6 is a schematic top view showing a planar light source according to a fifth preferred embodiment of the present invention.

Referring to FIG. 6, FIG. 6 is a schematic top view showing a planar light source 500 according to a fifth preferred embodiment of the present invention. The planar light source 500 includes an upper substrate (not shown), a lower substrate (not shown) and a plurality of luminous cavities, such as eight luminous cavities 540 of which the cross-sectional areas are substantially the same, wherein the distances between every two adjacent luminous cavities are different in size and the relationships among the distance sizes are that: the distance 545a is equal to the distance 545i; the distance 545i is wider than the distance 545b; the distance 545b is equal to the distance 545h; the distance 545h is wider than the distance 545c; the distance 545c is equal to the distance 545g; the distance 545g is wider than 545d; the distance 545d is equal to 545f; and the distance 545f is wider than 545e. The relationships of the sizes of the distances among luminous cavities are similar to those shown in FIG. 5. The difference between the planar light source 500 and 400 shown in FIG.5 is that the arrangement of the luminous cavities is changed from a horizontal arrangement to a vertical arrangement, thus preventing the phenomenon of too high operating voltage caused by an increased discharge length when the planar light source becomes larger in size. Because the function and result of the planar light source 500 is substantially the same as those of the planar light source 400 shown in FIG. 5, the details thereof are not reiterated herein.

Figure 7:
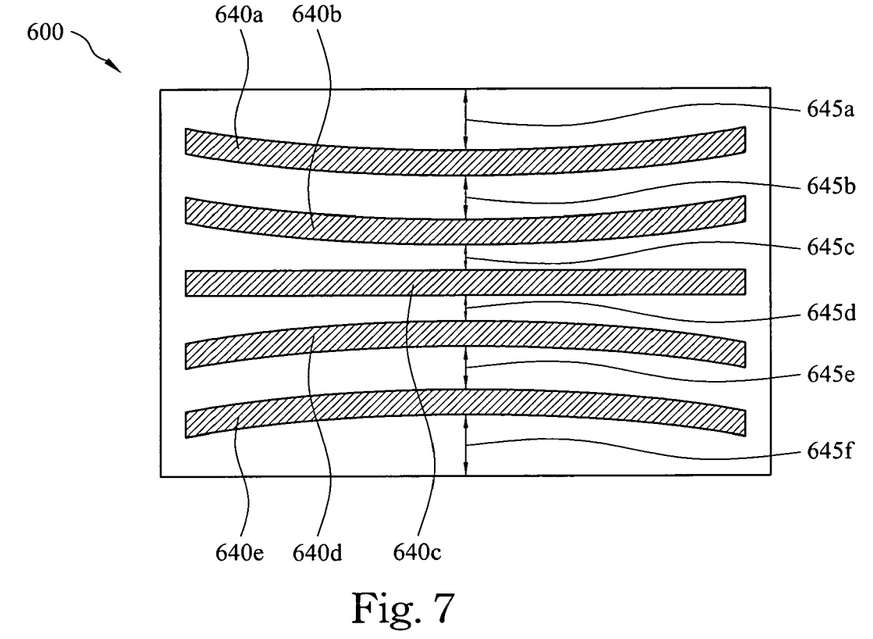
FIG. 7 is a schematic top view showing a planar light source according to a sixth preferred embodiment of the present invention.

Referring to FIG. 7, FIG. 7 is a schematic top view showing a planar light source 600 according to a sixth preferred embodiment of the present invention. The planar light source 600 includes an upper substrate (not shown), a lower substrate (not shown) and a plurality of luminous cavities, such as curved luminous cavities 640a, 640b, 640c, 640d, and 640e, wherein the cross-sectional areas of the luminous cavities 640a-640e are substantially the same, but the curvatures of the curved luminous cavities 640a-640e are different. Therefore, the distances between every two adjacent luminous cavities are not the same. The relationships of the sizes of the distances are that: the distance 645a is equal to the distance 645f; the distance 645f is wider than the distance 645b; the distance 645b is equal to the distance 645e; the distance 645e is wider than the distance 645c; and the distance 645c is equal to the distance 645d. The present embodiment is used to explain that the luminous cavities are not only with a contour shape of an arc shape but also with a contour shape of a straight-stripe shape, wherein such a design also can make the distances between every two luminous cavities at the central portion narrower than those at the edge portion, thereby making the lightness produced in the central portion higher than that in the edge portion.

Figure 8:
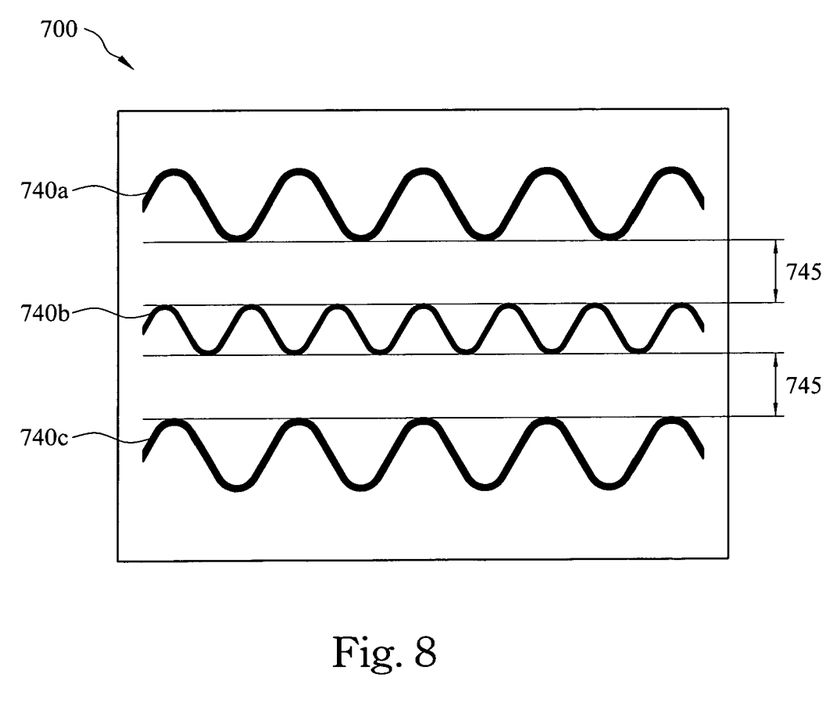
FIG. 8 is a schematic top view showing a planar light source according to a seventh preferred embodiment of the present invention.
Figure 9A:
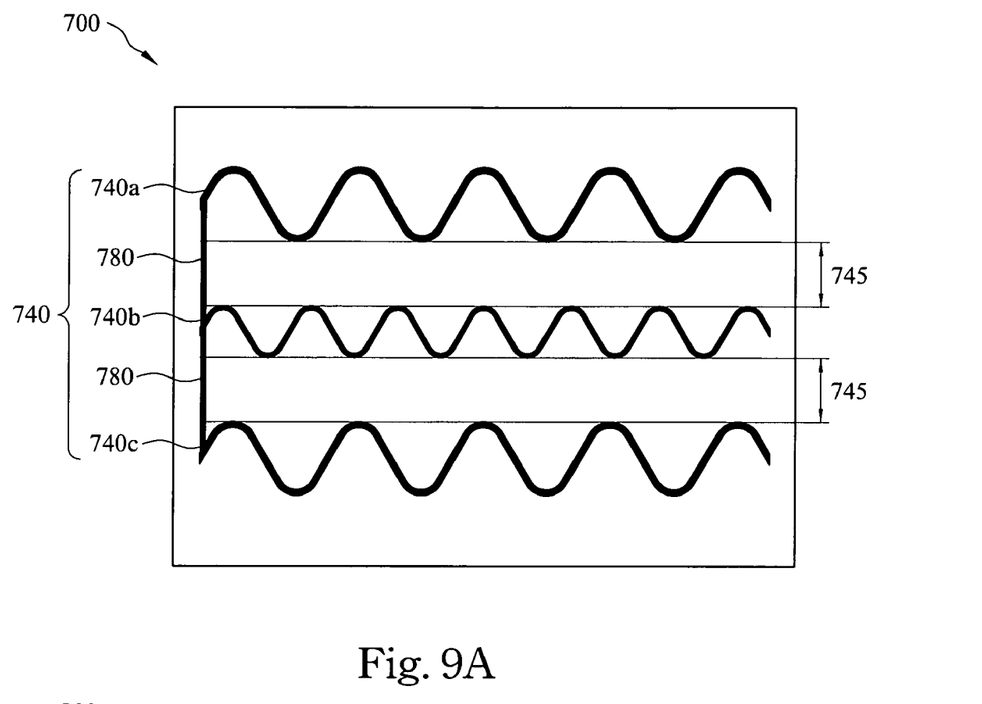
FIG. 9A is a schematic top view showing a planar light source according to an eighth preferred embodiment of the present invention.
Figure 9B:
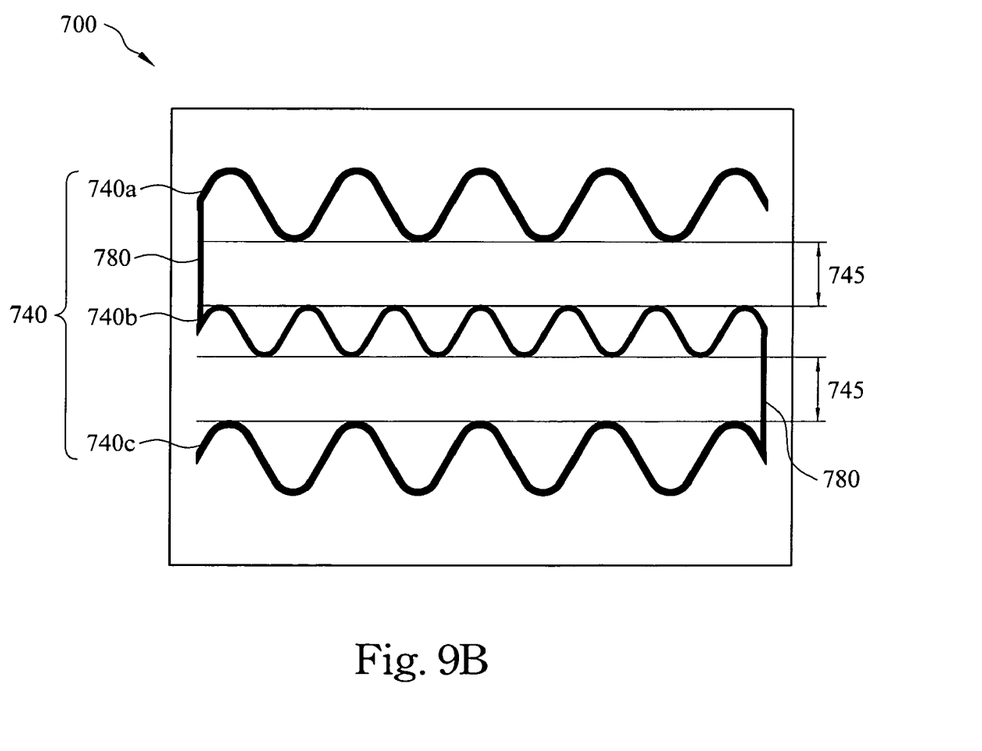
FIG. 9B is a schematic top view showing a planar light source according to a ninth preferred embodiment of the present invention.

Referring to FIG. 8, FIG. 8 is a schematic top view showing a planar light source 700 according to a seventh preferred embodiment of the present invention. The planar light source 700 includes an upper substrate (not shown), a lower substrate (not shown) and a plurality of luminous cavities, such as curved luminous cavities 740a, 740b and 740c. The relationships of the cross-sectional areas of the luminous cavities are that: the cross-sectional area of the luminous cavity 740*a* is equal to that of the luminous cavity 740*c* and the cross-sectional area of the luminous cavity 740*c* is greater than that of the luminous cavity 740*b*. The distances 745 between every two adjacent luminous cavities are substantially the same, but the curvatures of the curved luminous cavities are not the same, wherein the luminous cavity with a smaller curvature can produce a larger lightness due to a higher light density. The present embodiment is used to explain that the luminous cavities can be formed in a continuous meandering shape, besides in a straight-stripe shape, wherein such design can make the cross-sectional areas of the luminous cavities and distances between every two adjacent luminous cavities at the central portion smaller than those at the edge portion, thereby making the lightness produced in the central portion higher than that in the edge portion. Such as shown in FIG. 9A, a channel 780 may be disposed on the same sides of the luminous cavities 740*a*, 740*b* and 740*c* due to the consideration of manufacturing process, thereby forming a continuous luminous cavity 740 as shown in FIG. 9A. Alternatively, such as shown in FIG. 9B, channels 780 are used to connect the luminous cavity 740*a* to luminous cavity 740*b*; and the luminous cavity 740*b* to luminous cavity 740*c* in another way, i.e. luminous cavities can be connected to each other in various ways, and the present invention are not limited thereto. It can be understood that the embodiments described in the present invention can connect a plurality of luminous cavities via channels to form a continuous luminous cavity.

In general, the characteristic of the planar light source in the present invention is that the lightness of the central portion of the display panel can be increased by adjusting the arrangement of the cross-sectional areas of the luminous cavities and the distances between every two adjacent luminous cavities with keeping proper luminous uniformity, while the luminous cavities of the same power are used. Therefore, the present invention can resolve the power consumption problem of the display panel in which the light source of bigger power is installed at the central portion of the display panel for increasing the lightness thereof. In comparison with the conventional planar light source, the present invention can effectively resolve the energy-wasting problem of the display panel via a brief method of allocating the luminous cavity.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A planar light source, comprising:
   an upper substrate having a central portion and two edge portions;
   a lower substrate opposite to the upper substrate, a plurality of luminous cavities being formed by and between the upper substrate and the lower substrate, wherein a cross-sectional area of one of the luminous cavities corresponding to the central portion of the upper substrate is smaller than that of the luminous cavity corresponding to one of the two edge portions of the upper substrate, wherein the top and bottom of the luminous cavities are located on the same planes, respectively; and
   a plurality of spacers disposed between the upper substrate and the lower substrate to form the plurality of luminous cavities, wherein the spacers, the upper substrate and the lower substrate are formed as one piece.

2. The planar light source of claim 1, wherein the individual cross-sectional area of the luminous cavities is gradually increasing from the central portion to at least one of the two edge portions of the upper substrate.

3. The planar light source of claim 1, wherein the luminous cavities are external electrode fluorescent lamps (EEFLs).

4. The planar light source of claim 1, further comprising:
   a fluorescent layer disposed in each of the luminous cavities.

5. The planar light source of claim 1, wherein an area ratio of the central portion to the upper substrate ranges from about ¼ to about ¾.

6. The planar light source of claim 1, wherein each of the luminous cavities has a contour shape selected from the group consisting of a straight-stripe shape, an arc shape and a continuous meandering shape.

7. The planar light source of claim 1, wherein an area ratio of the central portion to the upper substrate ranges from about ⅛ to about ½.

8. The planar light source of claim 1, wherein the distance between two adjacent luminous cavities is substantially constant.

9. The planar light source of claim 1, wherein the distance between two adjacent luminous cavities corresponding to the central portion of the upper substrate is smaller than that between two adjacent luminous cavities corresponding to the at least one of the edge portions of the upper substrate.

10. The planar light source of claim 1, wherein every two adjacent luminous cavities are connected.

11. A planar light source, comprising:
    an upper substrate having a central portion and two edge portions;
    a lower substrate opposite to the upper substrate, a plurality of luminous cavities being formed by and between the upper substrate and the lower substrate, wherein a distance between two adjacent luminous cavities corresponding to the central portion of the upper substrate is smaller than that between two adjacent luminous cavities corresponding to the at least one of the edge portions of the upper substrate, wherein the top and bottom of the luminous cavities are located on the same planes, respectively; and
    a plurality of spacers disposed between the upper substrate and the lower substrate to form the plurality of luminous cavities, wherein the spacers, the upper substrate and the lower substrate are formed as one piece.

12. The planar light source of claim 11, wherein an area ratio of the central portion to the upper substrate ranges from about ¼ to about ¾.

13. The planar light source of claim 11, wherein the distance between two adjacent luminous cavities are gradually increasing from the central portion to at least one of the two edge portions of the upper substrate.

14. The planar light source of claim 11, further comprising:
    a fluorescent layer disposed in each of the luminous cavities.

15. The planar light source of claim 11, wherein every two adjacent luminous cavities are connected.

16. The planar light source of claim 11, wherein each of the luminous cavities has a contour shape selected from the group consisting of a straight-stripe shape, an arc shape and a continuous meandering shape.

17. The planar light source of claim 11, wherein an area ratio of the central portion to the upper substrate ranges from about ⅛ to about ½.

18. The planar light source of claim 11, wherein the cross-sectional area of the luminous cavities is substantially constant.

19. A planar light source, comprising:
- an upper substrate having a central portion and two edge portions;
- a lower substrate opposite to the upper substrate, a plurality of luminous cavities being formed by and between the upper substrate and the lower substrate, wherein a cross-sectional area of one of the luminous cavities corresponding to the central portion of the upper substrate is smaller than that of the luminous cavity corresponding to one of the two edge portions of the upper substrate;
- a plurality of spacers disposed between the upper substrate and the lower substrate to form the plurality of luminous cavities, wherein the spacers, the upper substrate and the lower substrate are formed as one piece; and
- a fluorescent layer disposed in each of the luminous cavities.

20. A planar light source, comprising:
- an upper substrate having a central portion and two edge portions;
- a lower substrate opposite to the upper substrate, a plurality of luminous cavities being formed by and between the upper substrate and the lower substrate, wherein a distance between two adjacent luminous cavities corresponding to the central portion of the upper substrate is smaller than that between two adjacent luminous cavities corresponding to the at least one of the edge portions of the upper substrate;
- a plurality of spacers disposed between the upper substrate and the lower substrate to form the plurality of luminous cavities, wherein the spacers, the upper substrate and the lower substrate are formed as one piece; and
- a fluorescent layer disposed in each of the luminous cavities.

* * * * *